US012482412B2

(12) United States Patent
Feng

(10) Patent No.: US 12,482,412 B2

(45) Date of Patent: Nov. 25, 2025

(54) MODEL ADJUSTMENT METHOD AND APPARATUS, DISPLAY APPARATUS AND STORAGE MEDIUM

(71) Applicant: BOE Technology Group Co., Ltd., Beijing (CN)

(72) Inventor: Ke Feng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/693,115

(22) PCT Filed: Jul. 28, 2023

(86) PCT No.: PCT/CN2023/109926

§ 371 (c)(1),
(2) Date: Mar. 18, 2024

(87) PCT Pub. No.: WO2024/045967

PCT Pub. Date: Mar. 7, 2024

(65) Prior Publication Data

US 2024/0290254 A1 Aug. 29, 2024

(30) Foreign Application Priority Data

Aug. 31, 2022 (CN) ......................... 202211057060.8

(51) Int. Cl.
*G09G 3/32* (2016.01)
*G09G 3/3208* (2016.01)

(52) U.S. Cl.
CPC ... *G09G 3/3208* (2013.01); *G09G 2320/0233* (2013.01); *G09G 2360/16* (2013.01)

(58) Field of Classification Search
CPC ... G09G 3/30–3291; G09G 2320/0233; G09G 2360/01
See application file for complete search history.

(56) References Cited

U.S. PATENT DOCUMENTS

2002/0113808 A1 8/2002 Weindorf et al.
2005/0162343 A1* 7/2005 Kim ......................... G09G 3/20 345/58

(Continued)

FOREIGN PATENT DOCUMENTS

CN 108281110 A 7/2018
CN 108877741 A 11/2018

(Continued)

OTHER PUBLICATIONS

PCT/CN2023/109926 international search report dated Nov. 10, 2023.

(Continued)

*Primary Examiner* — Roy P Rabindranath
(74) *Attorney, Agent, or Firm* — IPro, PLLC

(57) ABSTRACT

A model adjustment method and apparatus, a display device and a storage medium. The model adjustment apparatus includes: a display module (101), configured to display a first image; a compensation module (102), configured to compensate brightness of at least one of a first area or a second area in the first image according to a compensation value calculated by a preset model; a receiving module (103), configured to receive an adjustment value from a user for the compensation value; and an adjustment module (104), configured to adjust a parameter in the preset model according to the adjustment value. Parameters in the preset model can be adjusted according to the adjustment value input by the user.

13 Claims, 12 Drawing Sheets

(56) References Cited

U.S. PATENT DOCUMENTS

| | | | | |
|---|---|---|---|---|
| 2016/0005342 | A1* | 1/2016 | Park | G09G 3/3208 345/82 |
| 2016/0267834 | A1 | 9/2016 | Zheng et al. | |
| 2020/0286410 | A1 | 9/2020 | Wu | |
| 2021/0256900 | A1 | 8/2021 | Wu et al. | |
| 2023/0177990 | A1* | 6/2023 | Kang | G09G 5/373 345/694 |
| 2024/0169936 | A1* | 5/2024 | Jang | G09G 3/2003 |

FOREIGN PATENT DOCUMENTS

| | | | |
|---|---|---|---|
| CN | 110301000 | A | 10/2019 |
| CN | 110808003 | A | 2/2020 |
| CN | 111104086 | A | 5/2020 |
| CN | 113658538 | A | 11/2021 |
| CN | 113763878 | A | 12/2021 |
| CN | 113963671 | A | 1/2022 |
| CN | 112581903 | B | 5/2022 |
| CN | 115331625 | A | 11/2022 |
| CN | 115862563 | A | 3/2023 |
| WO | 2021150249 | A1 | 7/2021 |

OTHER PUBLICATIONS

PCT/CN2023/109926 Written Opinion dated Nov. 10, 2023.
CN 2022110570608 first office action dated Jan. 25, 2025.

* cited by examiner

MODEL ADJUSTMENT METHOD AND APPARATUS, DISPLAY APPARATUS AND STORAGE MEDIUM

CROSS-REFERENCE TO RELATED APPLICATIONS

This application is a national stage of International Application No. PCT/CN2023/109926, filed on Jul. 28, 2023, which claims priority to Chinese Patent Application No. 202211057060.8, filed on Aug. 31, 2022. Both of the aforementioned applications are hereby incorporated by reference in their entireties.

TECHNICAL FIELD

The present disclosure relates to the field of display technology, and in particular, to a model adjustment apparatus, a model adjustment method, a display device and a computer-readable storage medium.

BACKGROUND

With the development of display technology, display functions and display modes of display panels are gradually diversified, and when some display panels display images, instead of turning on the entire display panel for display, only a partial area of the display panel is turned on for display.

This may result in a difference in image display time for different areas of the display panel, and an area with a longer image display time (for example, referred to as a first area) has a larger life attenuation value, that is, a shorter remaining life, than an area with a shorter image display time (for example, referred to as a second area).

With life attenuation of elements in the display panel, display effect of the display panel may change, for example, brightness may decrease, and the first area and the second area may have different display effects due to different life attenuation values, for example, brightness of the first area may be lower than brightness of the second area.

In view of the above problems, in related arts, brightness is compensated by introducing a prior model. However, since parameters of different display panels have discrete difference, and the prior model is a preset fixed model, it is difficult to accurately compensate for different display panels, and there may be problems such as over-compensation and under-compensation.

SUMMARY

In view of the above, embodiments of the present disclosure provide a model adjustment apparatus, a model adjustment method, a display apparatus, and a computer-readable storage medium to solve the technical problems in related arts.

According to a first aspect of embodiments of the present disclosure, a model adjustment apparatus is provided, applied in a display panel, where the display panel at least includes a first area and a second area, a life attenuation value of the first area is greater than a life attenuation value of the second area, and the apparatus includes: a display module, configured to display a first image; a compensation module, configured to compensate brightness of at least one of the first area or the second area in the first image according to a compensation value calculated by a preset model; a receiving module, configured to receive an adjustment value from a user for the compensation value; and an adjusting module, configured to adjust a parameter in the preset model according to the adjustment value.

In an embodiment, the display panel includes an organic light emitting diode display panel.

In an embodiment, the first area is a non-rollable area, and the second area is a rollable area.

In an embodiment, the display module is further configured to display at least one of a brightness parameter or a grayscale parameter corresponding to the first image when displaying the first image.

In an embodiment, the display module is further configured to display an adjusted first image according to an adjustment of at least one of the brightness parameter or the grayscale parameter by the user.

In an embodiment, the compensation module is further configured to compensate, after each time the first image is adjusted, the brightness of at least one of the first area or the second area in the adjusted first image according to the compensation value calculated by the preset model; the receiving module is further configured to receive a respective adjustment value from the user for a respective compensation value calculated by the preset model each time; and the adjustment module is configured to adjust the parameter in the preset model according to adjustment values received in multiple times.

In an embodiment, the brightness parameter includes a Gamma band; and/or the grayscale parameter includes a grayscale value of a color corresponding to the first image.

In an embodiment, the adjusting module is configured to adjust a relation between grayscale and a correction value according to the adjustment value, where the correction value is determined based on a grayscale compensation value, a brightness correction coefficient, and a grayscale correction coefficient; adjust a first relation table between the grayscale compensation value and the life attenuation value, a second relation table between the brightness correction coefficient and the brightness value, and a third relation table between the grayscale correction coefficient and the grayscale value according to the adjusted relation; and adjust the parameter in the preset model according to the adjusted first relation table, second relation table and third relation table.

In an embodiment, the compensation module is configured to, when the first life attenuation value is greater than a first attenuation threshold, compensate the first area with a first compensation value calculated by the preset model; and/or, when the second life attenuation value is greater than a second life attenuation threshold, compensate the second area with a second compensation value calculated by the preset model.

According to a second aspect of embodiments of the present disclosure, a model adjustment method is provided, the method is performed by a display panel, the display panel includes at least a first area and a second area, a life attenuation value of the first area is greater than a life attenuation value of the second area, and the method includes: displaying a first image; compensating brightness of at least one of the first area or the second area in the first image according to a compensation value calculated by a preset model; receiving an adjustment value from a user for the compensation value; and adjusting a parameter in the preset model according to the adjustment value.

In an embodiment, the display panel includes an organic light emitting diode display panel.

In an embodiment, the first area is a non-rollable area, and the second area is a rollable area.

In an embodiment, the method further includes: displaying at least one of a brightness parameter or a grayscale parameter corresponding to the first image when displaying the first image.

In an embodiment, the method further includes: displaying an adjusted first image according to an adjustment of at least one of the brightness parameter or the grayscale parameter by the user.

In an embodiment, the method further includes: compensating, after each time the first image is adjusted, the brightness of at least one of the first area or the second area in the adjusted first image according to the compensation value calculated by the preset model; receiving respective adjustment value from the user for a respective compensation value calculated by the preset model each time; and adjusting the parameter in the preset model according to the adjustment value includes: adjusting the parameter in the preset model according to adjustment values received in multiple times.

In an embodiment, the brightness parameter includes a gamma curve; and/or the grayscale parameter includes a grayscale value of a color corresponding to the first image.

In an embodiment, adjusting the parameter in the preset model according to the adjustment value includes: adjusting a relation between grayscale and a correction value according to the adjustment value, where the correction value is determined based on a grayscale compensation value, a brightness correction coefficient, and a grayscale correction coefficient; adjusting a first relation table between the grayscale compensation value and the life attenuation value, a second relation table between the brightness correction coefficient and the brightness value, and a third relation table between the grayscale correction coefficient and the grayscale value according to the adjusted relation; and adjusting the parameter in the preset model according to the adjusted first relation table, second relation table and third relation table.

In an embodiment, compensating brightness of at least one of the first area or the second area in the first image according to a compensation value calculated by a preset model includes: when the first life attenuation value is greater than a first attenuation threshold, compensating the first area with a first compensation value calculated by the preset model; and/or, when the second life attenuation value is greater than a second life attenuation threshold, compensating the second area with a second compensation value calculated by the preset model.

According to a third aspect of embodiments of the present disclosure, a display apparatus is provided, where the display apparatus includes a display panel, the display panel at least includes a first area and a second area, a life attenuation value of the first area is greater than a life attenuation value of the second area, and the display apparatus further includes: a processor; and a memory for storing a processor-executable instruction; where the processor is configured to implement the above method.

According to a fourth aspect of embodiments of the present disclosure, a computer-readable storage medium is provided, where the computer-readable storage medium stores a computer program, and when the program is executed by a processor, the above method is implemented.

According to embodiments of the present disclosure, parameters in the preset model can be adjusted according to the adjustment value input by the user, so that the adjusted preset model is applicable for a current difference between life attenuation values of the first area and second area of the display panel, and then the brightness of at least one of the first area or the second area can be accurately compensated according to the compensation value calculated by the adjusted preset model, thereby ensuring good display effect.

BRIEF DESCRIPTION OF DRAWINGS

In order to more clearly illustrate technical solutions in the embodiments of the present disclosure, the accompanying drawings required in the description of the embodiments will be briefly described below, obviously, the accompanying drawings in the following description are only some embodiments of the present disclosure, and for those skilled in the art, other accompanying drawings may also be obtained according to these accompanying drawings without making creative efforts.

DETAILED DESCRIPTION

The technical solutions in the embodiments of the present disclosure will be clearly and completely described below with reference to the accompanying drawings in the embodiments of the present disclosure, and obviously, the described embodiments are only some but not all of the embodiments of the present disclosure. Based on the embodiments in the present disclosure, all other embodiments obtained by those skilled in the art without making creative efforts fall within the protection scope of the present disclosure.

The terminology used in the embodiments of the present disclosure is merely for the purpose of describing specific embodiments, and is not intended to limit the embodiments of the present disclosure. The singular forms "a" and "the" used in the embodiments of the present disclosure and the appended claims are also intended to include plural forms unless the context clearly indicates other meanings. It should also be understood that the term "and/or" as used herein refers to and includes any or all possible combinations of one or more associated listed items.

It should be understood that although the terms first, second, third, etc, may be used to describe various information in the embodiments of the present disclosure, these information should not be limited to these terms. These terms are only used to distinguish a same type of information from each other. For example, without departing from the scope of the embodiments of the present disclosure, the first area may also be referred to as a second area, and similarly, the second area may also be referred to as a first area. Depending on context, word "if" as used herein can be interpreted as "when" or "upon" or "in response to determining".

For purposes of brevity and ease of understanding, the terms used herein in characterizing the size relation are "greater than" or "less than", "higher than" or "lower than". However, those skilled in the art may understand that the term "greater than" also covers the meaning of "greater than or equal to", and "less than" also covers the meaning of "less than or equal to"; the term "higher than" covers the meaning of "higher than or equal to", and "lower than" also covers the meaning of "lower than or equal to".

Figure 1:
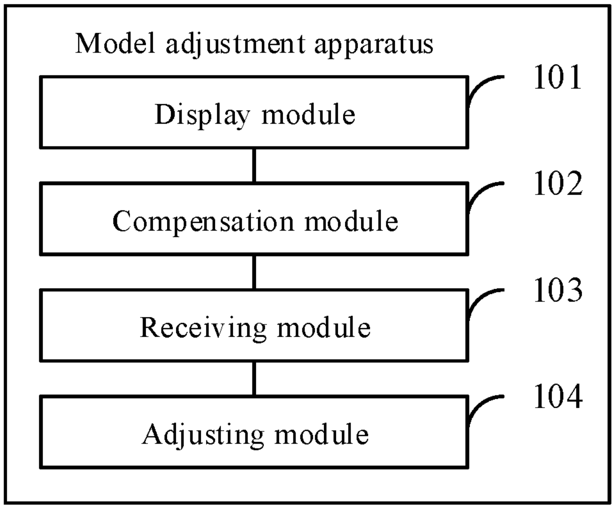
FIG. 1 is a schematic block diagram of a model adjustment apparatus according to an embodiment of the present disclosure.

FIG. 1 is a schematic block diagram of a model adjustment apparatus according to an embodiment of the present disclosure. The model adjustment apparatus shown in this embodiment may be applied in a display panel, and may be an apparatus formed by modules in the display panel, the display panel includes at least a first area and a second area, and a life attenuation value of the first area is greater than a life attenuation value of the second area.

As shown in FIG. 1, the apparatus includes:

a display module 101, configured to display a first image;

a compensation module 102, configured to compensate brightness of at least one of the first area or the second area in the first image according to a compensation value calculated by a preset model;

a receiving module 103, configured to receive an adjustment value from a user for the compensation value; and an adjusting module 104, configured to adjust a parameter in the preset model according to the adjustment value.

In one embodiment, the display panel includes an organic light emitting diode (OLED) display panel. The OLED display panel is provided with an organic light emitting layer, and with the use of the display panel, a life of the organic light emitting layer will be attenuated, resulting in reduction of light-emitting brightness, and the longer the use time is, the greater the life attenuation value is.

In an embodiment, the first area is a non-rollable area, and the second area is a rollable area.

Figure 2A:
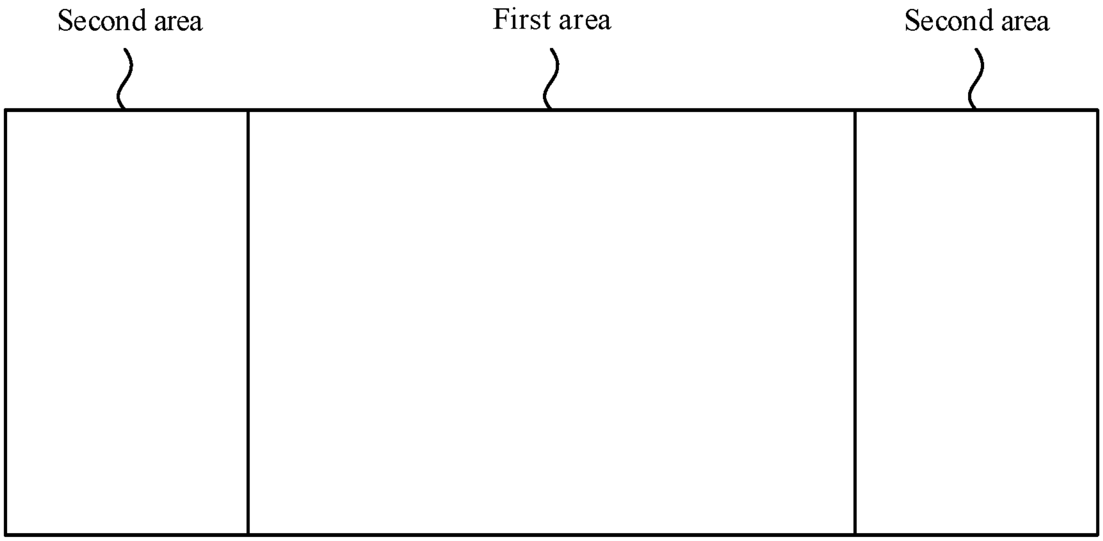
FIG. 2A is a schematic diagram of a display panel according to an embodiment of the present disclosure.
Figure 2B:
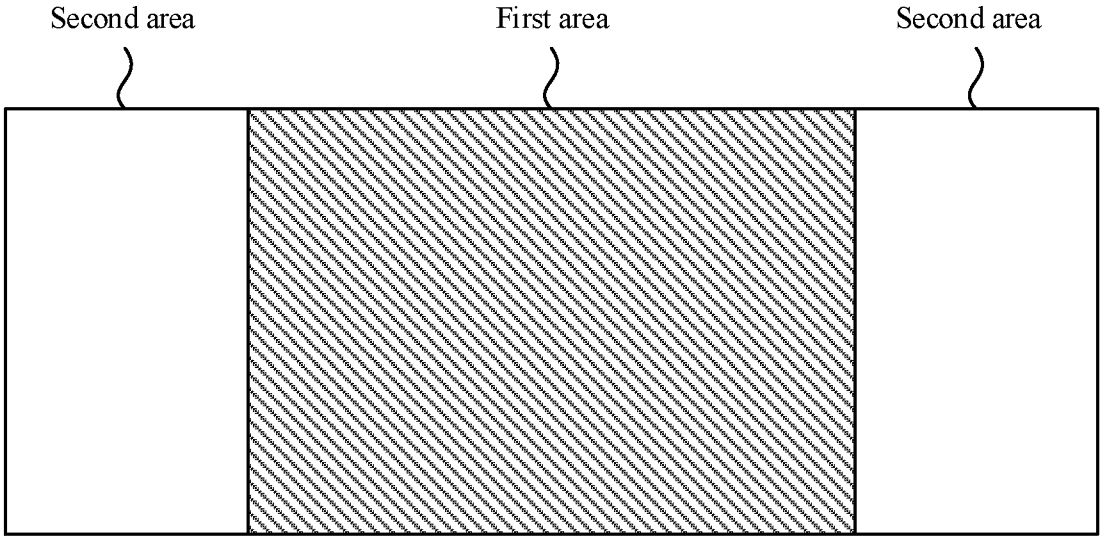
FIG. 2B is a schematic diagram of displaying an image through a first area according to an embodiment of the present disclosure.
Figure 2C:
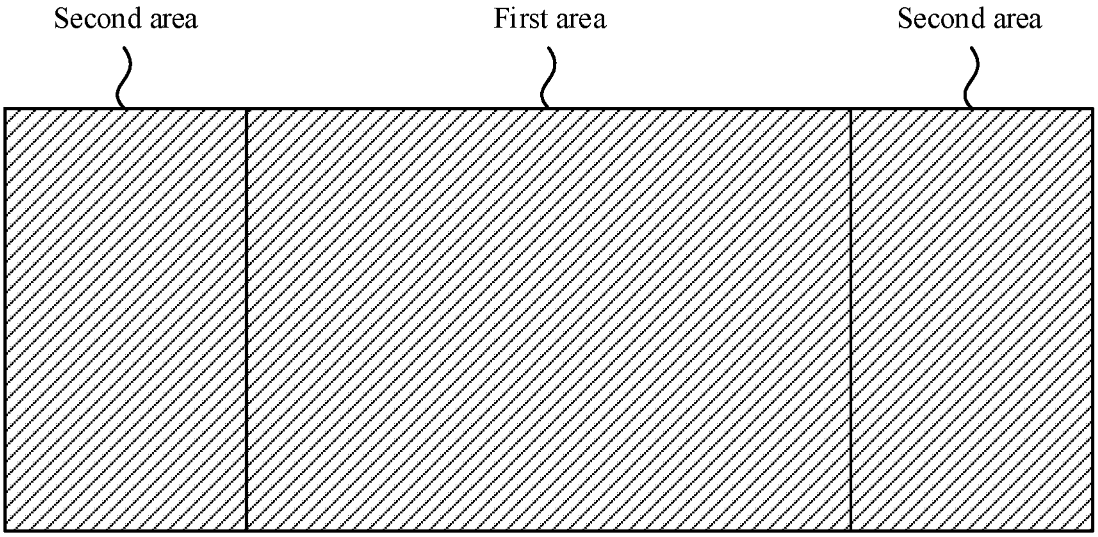
FIG. 2C is a schematic diagram of displaying an image through a first area and a second area according to an embodiment of the present disclosure.

FIG. 2A is a schematic diagram of a display panel according to an embodiment of the present disclosure. FIG. 2B is a schematic diagram of displaying an image through a first area according to an embodiment of the present disclosure. FIG. 2C is a schematic diagram of displaying an image through a first area and a second area according to an embodiment of the present disclosure.

As shown in FIG. 2A, the OLED display panel may be a flexible panel, and the flexible panel may include a non-rollable area (also referred to as a fixed area) and a rollable area. In order to simplify the description, the non-rollable area is referred to as a first area, and the rollable area is referred to as a second area.

The second area may be as shown in FIG. 2A, which may include two areas disposed on two sides of the first area, or may include only one area disposed on one side of the first area, or may include a plurality of areas disposed around the first area in other manners.

When a user is using the flexible panel, as shown in FIG. 2B, an image may be displayed only through the first area, and the second area is in a rolled-up state; or as shown in FIG. 2C, the second area may be unrolled, and then the image is displayed through both the first area and the second area. It should be noted that displaying the first image in all embodiments of the present disclosure refers to displaying the first image through both the first area and the second area.

No matter whether the image is displayed through the first area only, as shown in FIG. 2B, or through both the first area and the second area, as shown in FIG. 2C, the first area always needs to be lit-up. This results in a longer usage duration of the first area relative to a usage duration of the second area, and a longer usage duration results in more life attenuation, that is, a life attenuation value of the first area is greater than a life attenuation value of the second area, which may also be described as a remaining life of the first area is less than a remaining life of the second area.

In this case, when the image is displayed by using both the first area and the second area, brightness of the first area is lower than brightness of the second area, especially when a pure color picture is displayed, the user will intuitively observe that the brightness of the first area is lower than that of the second area.

It should be noted that the first area and the second area in the present disclosure are not limited to the non-rollable area and the rollable area in the embodiments shown in FIG. 2A to FIG. 2C, and the display panel is not limited to the flexible panel. As long as the two areas in the display panel have different life attenuation values, the technical solution of the present disclosure is applicable. For ease of description of the technical solutions of the present application, the display panel shown in FIG. 2A to FIG. 2C is mainly used as an example for description below.

Since the life attenuation value of the first area is greater than the life attenuation value of the second area, the brightness of the first area is lower than the brightness of the second area. To overcome this problem, a compensation value may be calculated by using a preset model, to compensate for brightness of the first area and/or the second area in the first image.

For example, the brightness can be compensated for the first area, and then brightness of the first area may be increased according to the compensation value, so that the brightness of the first area is same as the brightness of the second area (in all embodiments of the present disclosure, the brightness of the first area being same as the brightness of the second area refers to that the brightness of the first area is same as the brightness of the second area when two areas display a same image).

For example, the brightness can be compensated for the second area, and then brightness of the second area may be reduced according to the compensation value, so that the brightness of the first area is same as the brightness of the second area For example, the brightness can be compensated for both the first area and the second area, and then brightness of the first area and the second area may be increased according to the compensation value, where brightness of the first area is increased more, so that the brightness of the first area is same as the brightness of the second area; or brightness of the first area can be increased and brightness of the second area can be reduced according to the compensation value, so that the brightness of the first area is same as the brightness of the second area.

The specific compensation manner is not limited in the present disclosure, and may be set as required.

In an embodiment, the preset model includes, but is not limited to, a Burn In algorithm model, and life attenuation values of the first area and the second area may be determined when the display panel displays the first image, for example, the life attenuation values are determined according to usage durations of the first area and the second area, and the longer the usage duration is, the greater the life attenuation value is.

Since the preset model is a prior model, parameters therein are preset, which may be suitable for compensating for brightness to some extent (for example, in a case of small difference between the life attenuation values of the first area and the second area). However, since there is a discrete difference in parameters of the display panel (for example, due to a manufacturing process), for example, some display panels have relatively fast life attenuation speeds, which results in a relatively large difference in life attenuation values of the first area and the second area, and compensation performed according to the compensation value determined by the preset model is insufficient to compensate the brightness of the first area to be the same as the brightness of the second area, which is referred to as under-compensation; for example, some display panels have relatively slow life attenuation speeds, which results in a relatively small difference in life attenuation values of the first area and the second area, and compensation performed according to the compensation value determined by the preset model results in that the brightness of the first area is compensated to exceed the brightness of the second area, which is referred to as over-compensation.

Aiming at problems like under-compensation and over-compensation existing in compensation by adopting the compensation value calculated by the preset model, embodiments of the present disclosure provide a function of adjusting the compensation value by the user, for example, an input window for adjusting the compensation value may be displayed in the display panel, and the user may determine how to adjust the compensation value according to needs, so as to input an adjustment value for the compensation value in the window.

For example, when the brightness displayed in the first area is determined to be higher than the brightness of the second area after compensation is performed according to the compensation value, it shows the problem of over-compensation, and the compensation value may be reduced by inputting the adjustment value; for example, after the brightness displayed in the first area is determined to be lower than the brightness of the second area after compensation is performed according to the compensation value, it shows that the problem of under-compensation, and the compensation value may be increased by inputting the adjustment value.

Further, parameters in the preset model can be adjusted according to the adjustment value input by the user, so that the adjusted preset model is applicable for a current difference between life attenuation values of the first area and second area of the display panel, and then the brightness of at least one of the first area or the second area can be accurately compensated according to the compensation value calculated by the adjusted preset model, thereby ensuring good display effect.

Figure 3:
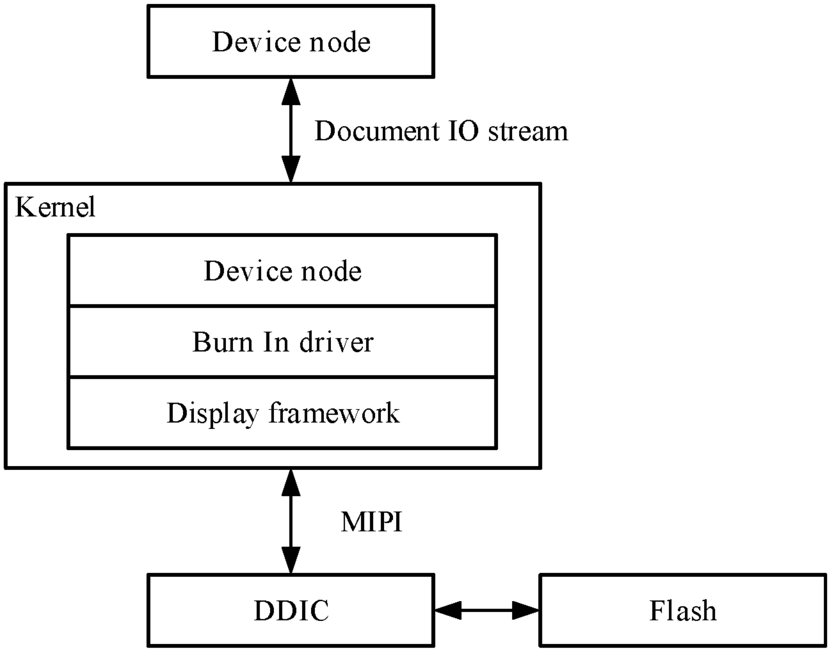
FIG. 3 is a schematic diagram of adjusting parameters in a preset model according to an embodiment of the present disclosure.

FIG. 3 is a schematic diagram of adjusting parameters in a preset model according to an embodiment of the present disclosure.

As shown in FIG. 3, taking the preset model being a Burn In algorithm model as an example, the model may be written into a display drive integrated circuit (DDIC) of the display panel, for example, specifically in a memory (e.g., Flash) of the DDIC.

Embodiments of the present disclosure may be implemented based on a Linux kernel and a DRM (Direct Rendering Manager) display framework. The parameters of the preset model in the DDIC may be adjusted by using a DRM MIPI (Mobile Industry Processor Interface) communicating with an API (Application Programming Interface).

A driver based on the Burn In algorithm may also be written therein, a register parameter node related to the DDIC Burn In IP is created in the driver, and an upper layer implements read-write operations of the device node through the file IO (Input/Output) stream.

In this case, a UI (User Interface) for inputting the adjustment value may be provided to the user, and the user may input the adjustment value in the UI, and then the adjustment value is transmitted to the kernel through the file IO stream, and then transmitted to the DDIC through the kernel, so as to adjust a parameter of a preset model in the Flash corresponding to the DDIC.

In an embodiment, the compensation module is configured to, when the first life attenuation value is greater than a first attenuation threshold, compensate the first area with a first compensation value calculated by the preset model; and/or, when the second life attenuation value is greater than a second life attenuation threshold, compensate the second area with a second compensation value calculated by the preset model.

In an embodiment, since a difference between the brightness of the first area and the brightness of the second area is relatively small when the life attenuation value is relatively small, it is unnecessary to perform compensation according to the compensation value calculated by the preset model; and when the life attenuation value is relatively large, a difference between the brightness of the first area and the brightness of the second area is relatively large, this is the case that compensation needs to be performed according to the compensation value calculated by the preset model.

Therefore, for the first area and the second area, attenuation thresholds may be set respectively, and when the life attenuation value is greater than the attenuation threshold, the compensation is performed according to the compensation value calculated by the preset model. For example, a first attenuation threshold may be set for the first area, and when the first life attenuation value is greater than the first attenuation threshold, the first area is compensated by using the first compensation value calculated by the preset model; and a second attenuation threshold may be set for the second area, and when the second life attenuation value is greater than the second attenuation threshold, the second area is compensated by using the second compensation value calculated by the preset model.

Since the life attenuation value corresponds to the remaining life, and the greater the life attenuation value is, the less the remaining life is, a life threshold may also be set, and when the remaining life is less than the life threshold, the compensation is performed by using the compensation value calculated by the preset model.

Figure 4A:
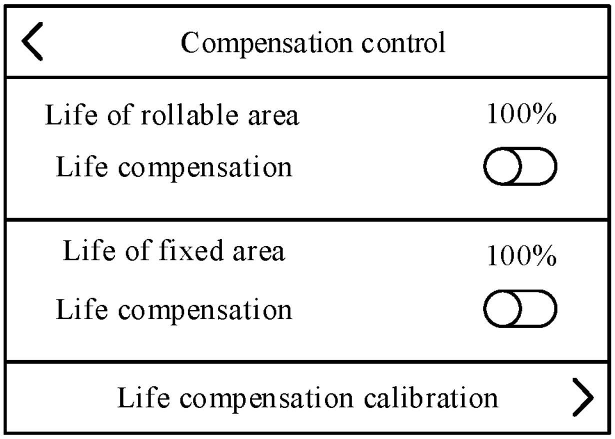
FIG. 4A, FIG. 4B and FIG. 4C are schematic diagrams of a switch for compensating according to a compensation value calculated by a preset model according to an embodiment of the present disclosure.
Figure 4B:
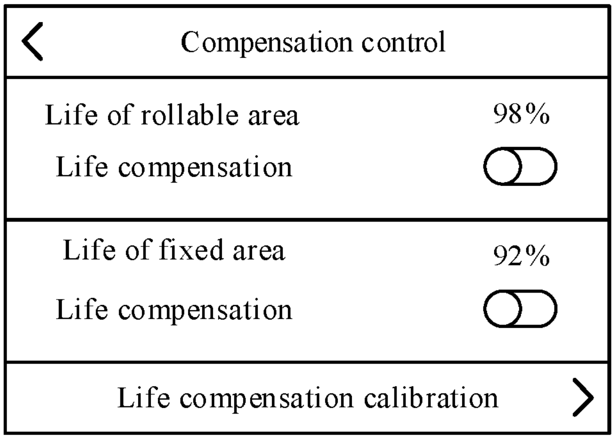
Figure 4C:
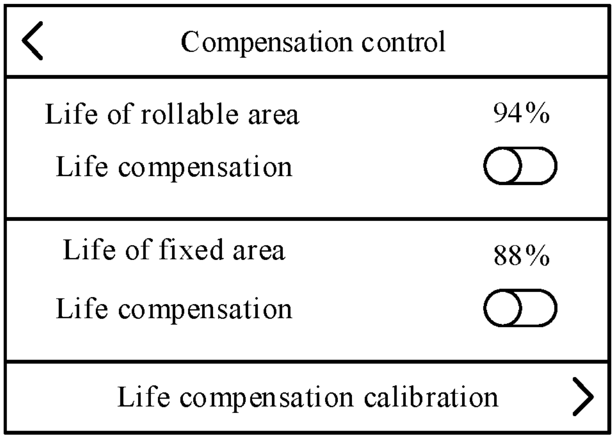

FIG. 4A, FIG. 4B and FIG. 4C are schematic diagrams of a switch for compensating according to a compensation value calculated by a preset model according to an embodiment of the present disclosure.

A window displayed by the display panel may include a first remaining life of the first area (fixed area) and a second remaining life of the second area (sliding area), where the remaining life may be presented in a form of a percentage.

The window may further include a switch for controlling compensation with the compensation value calculated by the preset model, and the switch may be automatically turned on or off, for example, when the first remaining life of the first area is lower than the first life threshold, the switch may be automatically changed from an OFF state to an ON state, and then the first area is compensated by using a first compensation value calculated by the preset model; for example, when the second remaining life of the second area is lower than the second life threshold, the switch may be automatically changed from an OFF state to an ON state, and then the second area is compensated by using the second compensation value calculated by the preset model.

Certainly, the switch may also be manually turned on or off, for example, the user may select to change the switch from the OFF state to the ON state or from the ON state to the OFF state according to the remaining life. After the switch is automatically changed from the OFF state to the ON state, if the user manually changes the switch back to the OFF state, subsequently the switch may no longer be automatically changed to the ON state, or the switch may no longer be automatically changed to the ON state within a preset duration.

It should be noted that the first life threshold and the second life threshold may be equal or unequal, and may specifically be set according to actual needs. For convenience of illustrating, it is taken as an example that the first life threshold and the second life threshold are equal, for example, both are 95%.

In a first stage, the display panel is almost unused. As shown in FIG. 4A, the first remaining life of the first area and the second remaining life of the second area are both 100%. It may be determined that the first remaining life is greater than the first life threshold, and the second remaining life is greater than the second life threshold, so that switches corresponding to the two areas are both in an OFF state, and for the first area and the second area, compensation does not need to be performed by using the compensation value calculated by using the preset model.

In a second stage, the display panel is used for a period of time. As shown in FIG. 4B, since a usage duration of the first area is longer than a usage duration of the second area, the life of the first area attenuates more, and the remaining life of the first area is less, that is, the first remaining life is less than the second remaining life, for example, the first remaining life is 92%, and the second remaining life is 98%. It may be determined that the first remaining life is less than the first life threshold, the second remaining life is greater than the second life threshold, the switch corresponding to the first area is in the ON state, and the switch corresponding to the second area is in the OFF state, so that the first area is compensated by using the first compensation value calculated by the preset model, where the first compensation value may be calculated by the preset model based on the first life attenuation value or the first remaining life.

In a third stage, the display panel is further used for another period of time. As shown in FIG. 4B, for example, the first remaining life is 88%, and the second remaining life is 94%. It may be determined that the first remaining life is less than the first life threshold, the second remaining life is less than the second life threshold, the switch corresponding to the first area is in the ON state, and the switch corresponding to the second area is also in the ON state, so that the first area is compensated by using the first compensation value calculated by the preset model, and the second area is compensated by using the second compensation value calculated by the preset model, where the first compensation value may be calculated by the preset model based on the first life attenuation value or the first remaining life, and the second compensation value may be calculated by the preset model based on the second life attenuation value or the second remaining life.

As shown in FIG. 4A, FIG. 4B, and FIG. 4C, in addition to displaying content such as remaining life and a switch in the window, a return button used for returning to a previous operation list (for example, a "set" operation list) and a button used for entering a "life compensation calibration" operation interface may be displayed, and the user may input an adjustment value for the compensation value in the "life compensation calibration" operation interface.

Based on the following embodiments, adjustments on the compensation value by the user will be described with reference to examples.

In an embodiment, the display module is further configured to display at least one of a brightness parameter or a grayscale parameter corresponding to the first image when displaying the first image.

In an embodiment, the brightness parameter includes a Gamma band; and/or the grayscale parameter includes a grayscale value of a color corresponding to the first image.

The first image may be a pure color image displayed by using the first area and the second area, for example, a red (R) image, a green (G) image, or a blue (B) image.

When the first image is displayed, parameters corresponding to the first image, such as a brightness parameter and a grayscale parameter, may also be displayed. The grayscale parameter may be, for example, a grayscale of a binding point, m binding points may be set, where m is an integer greater than or equal to 1, and following embodiments mainly take m=8 as an example, for example, a grayscale of the binding point is 255, and corresponding red R, green G, and blue B may be respectively represented as R255, G255, and B255; the brightness parameter may be a Gamma band, for example, n Gamma bands may be set, band #1 to band #n, where n is an integer greater than or equal to 1, for example, n may be equal to 10, 12, etc., and corresponding target brightness of each Gamma band at a grayscale of 255 (a grayscale of a white image) may be different.

For example, when the first image is a pure red image with a grayscale parameter of R255 and a brightness parameter of band #1, then in the first image, the displayed brightness parameter is band #1, and the displayed grayscale parameter is R255.

For example, when the first image is a pure red image with a grayscale parameter of R255 and a brightness parameter of band #2, then in the first image, the displayed brightness parameter is band #2, and the displayed grayscale parameter is R255.

For example, when the first image is a pure blue image with a grayscale parameter of B255 and a brightness parameter of band #2, then in the first image, the displayed brightness parameter is band #2, and the displayed grayscale parameter is B255.

Specifically, the first image may be set as required, and the grayscale parameter, the brightness parameter and the like may be adjusted to control the display panel to display the required first image. By observing the first image, the user can determine a difference between the first area and the second area in the first image after performing compensation by using the compensation value calculated by the preset model, so as to make an accurate adjustment.

The embodiments of the present disclosure will be illustrated below mainly in a case that the brightness parameter is band #1 and the displayed grayscale parameter is R255.

It should be noted that, there are mainly two cases when the preset model calculates the compensation value to compensate the brightness of the first area and/or the second area: case 1, the preset model calculates the first compensation value to compensate the first area; case 2, the preset model calculates the first compensation value to compensate the first area, and calculates the second compensation value to compensate the second area. Further, a third compensation case may be additionally set as required: case 3, the preset model calculates the second compensation value to compensate the second area.

The following embodiments mainly describe case 1 and case 2, where case 1 is a case in which the first remaining life is less than the first life threshold and the second remaining life is greater than the second life threshold, and only the first area is compensated; and case 2 is a case in which the first remaining life is less than the first life threshold and the second remaining life is less than the second life threshold, and both the first area and the second area are compensated.

Figure 5A:
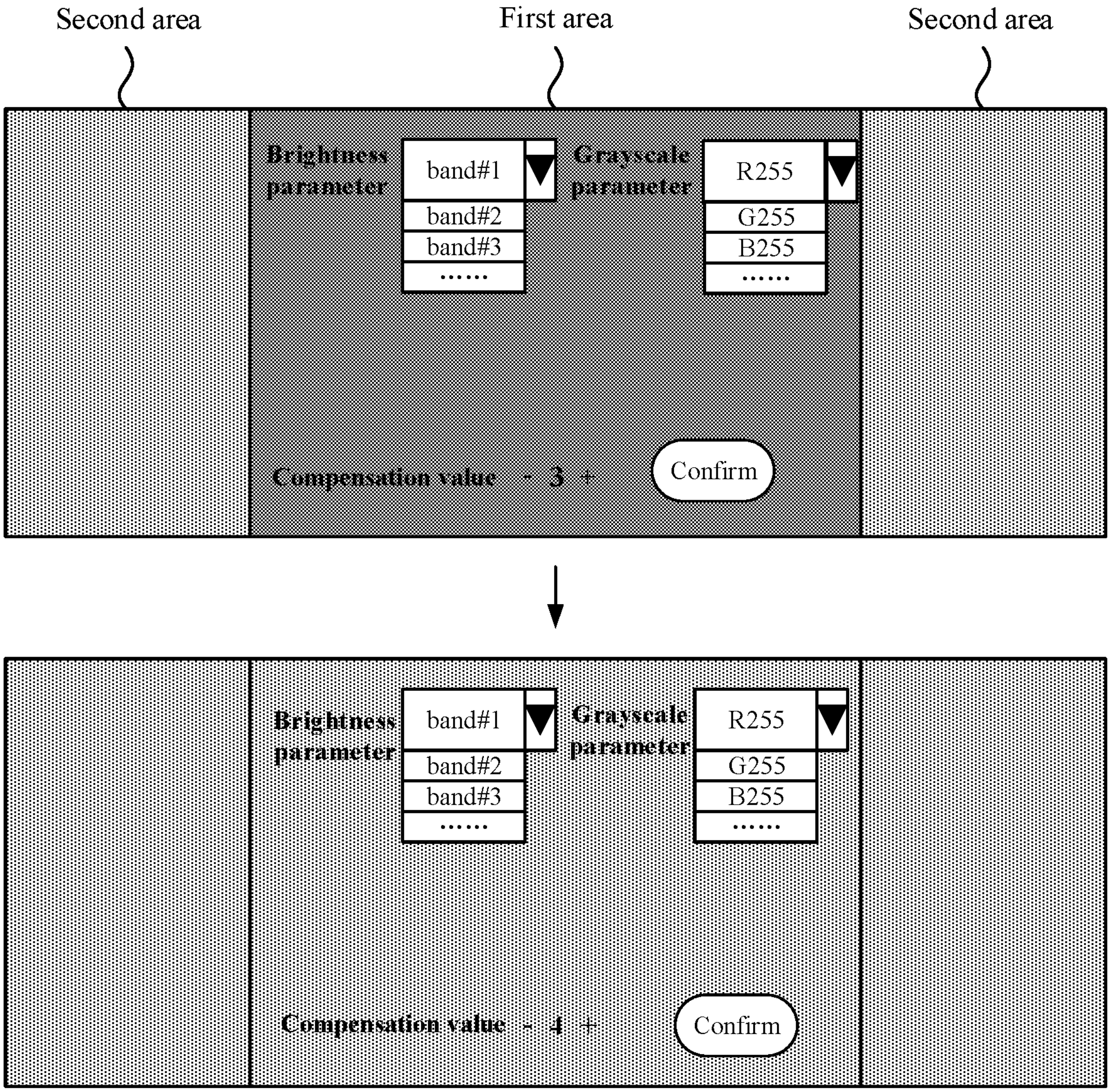
FIG. 5A is a schematic diagram of adjusting a compensation value by a user according to an embodiment of the present disclosure.

FIG. 5A is a schematic diagram of adjusting a compensation value by a user according to an embodiment of the present disclosure.

As shown in FIG. 5A, for example, a pure red image with a grayscale parameter of R255 and a brightness parameter of band #1 is displayed by the display panel, and after the preset model calculates the first compensation value to compensate for the brightness of the first area, the brightness of the first area is still lower than the brightness of the second area, that is, there is a problem of under-compensation for the first area.

In this case, the first compensation value calculated by the preset model and an adjustment button for the first compensation value may be displayed in the first area (for example, a bottom of the first area shown in FIG. 5A), for example, the adjustment button may include a button for reducing the first compensation value on a left side of the first compensation value, and a button for increasing the first compensation value on a right side of the first compensation value, and may further include a confirmation button for confirming an adjusted first compensation value.

Since there is an under-compensation problem, the user may increase the first compensation value, for example, as shown in FIG. 5A, the user may increase the first compensation value from 3 to 4, and the display panel may compensate the brightness of the first area according to the adjusted first compensation value, and content in the first area is displayed based on a compensated brightness. For example, as shown in FIG. 5A, when the first compensation value is 4, the brightness of the first area is same as the brightness of the second area, so that the under-compensation problem is solved, and the user can press the confirmation button to confirm the adjustment value (i.e., +1) on the first compensation value.

The display panel can adjust the parameters in the preset model (in a corresponding memory) in the DDIC based on the adjustment value, so that the first area is subsequently compensated based on the first compensation value calculated by the adjusted preset model, and the above under-compensation problem can be avoided.

Figure 5B:
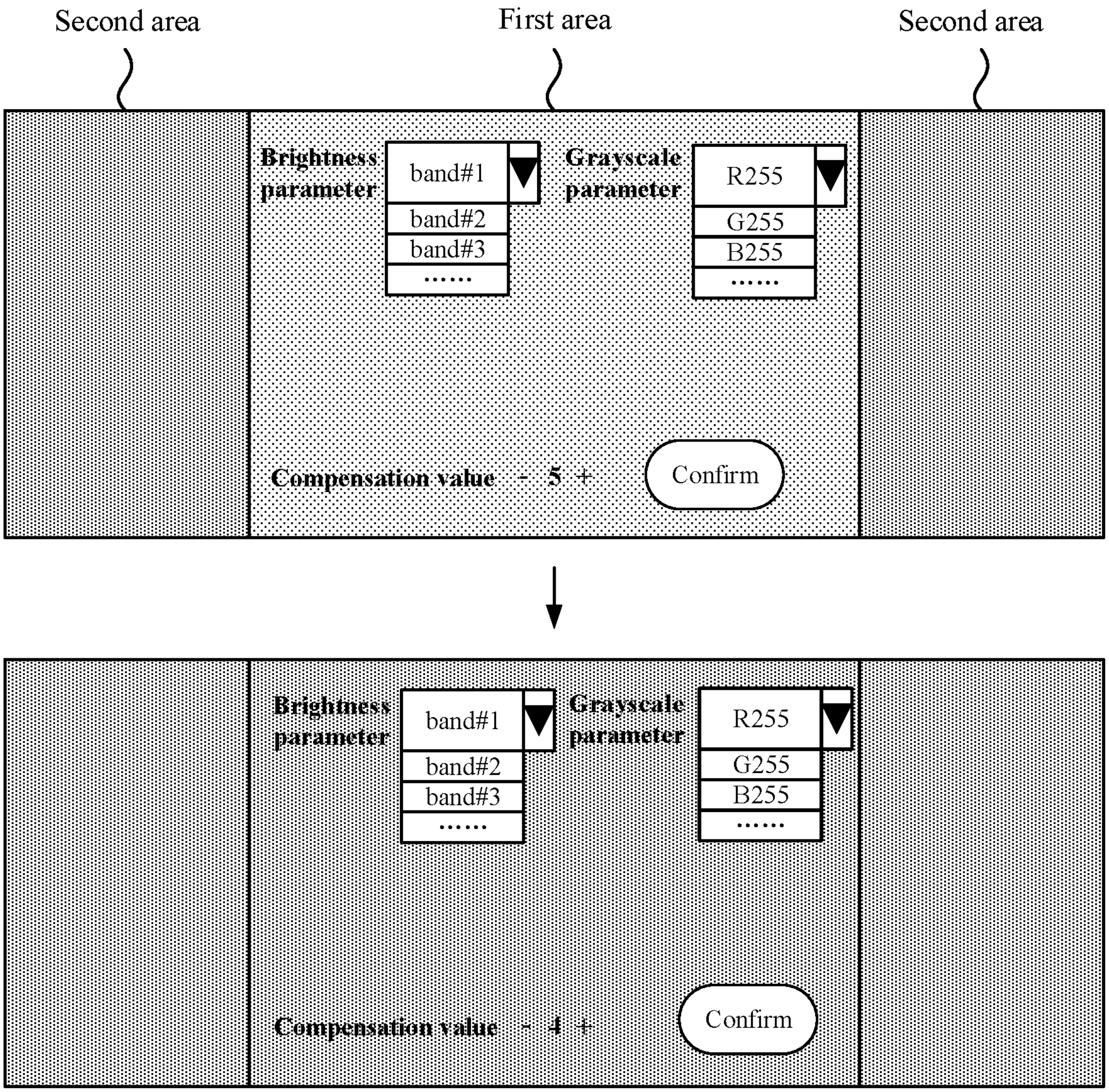
FIG. 5B is another schematic diagram illustrating another user adjusting compensation value according to an embodiment of the present disclosure.

FIG. 5B is another schematic diagram illustrating another user adjusting compensation value according to an embodiment of the present disclosure.

As shown in FIG. 5B, for example, a pure red image with a grayscale parameter of R255 and a brightness parameter of band #1 is displayed by the display panel, and after the preset model calculates the first compensation value to compensate for the brightness of the first area, the brightness of the first area is higher than the brightness of the second area, that is, there is a problem of over-compensation for the first area.

In this case, the first compensation value calculated by the preset model and an adjustment button for the first compensation value may be displayed in the first area (for example, a bottom of the first area shown in FIG. 5B), for example, the adjustment button may include a button for reducing the first compensation value on a left side of the first compensation value, and a button for increasing the first compensation value on a right side of the first compensation value, and may further include a confirmation button for confirming an adjusted first compensation value.

Since there is an over-compensation problem, the user may reduce the first compensation value, for example, as shown in FIG. 5B, the user may reduce the first compensation value from 5 to 4, and the display panel may compensate the brightness of the first area according to the adjusted first compensation value, and content in the first area is displayed based on a compensated brightness. For example, as shown in FIG. 5B, when the first compensation value is 4, the brightness of the first area is same as the brightness of the second area, so that the over-compensation problem is solved, and the user can press the confirmation button to confirm the adjustment value (i.e., −1) on the first compensation value.

The display panel can adjust the parameters in the preset model (in a corresponding memory) in the DDIC based on the adjustment value, so that the first area is subsequently compensated based on the first compensation value calculated by the adjusted preset model, and the above over-compensation problem can be avoided.

Figure 5C:
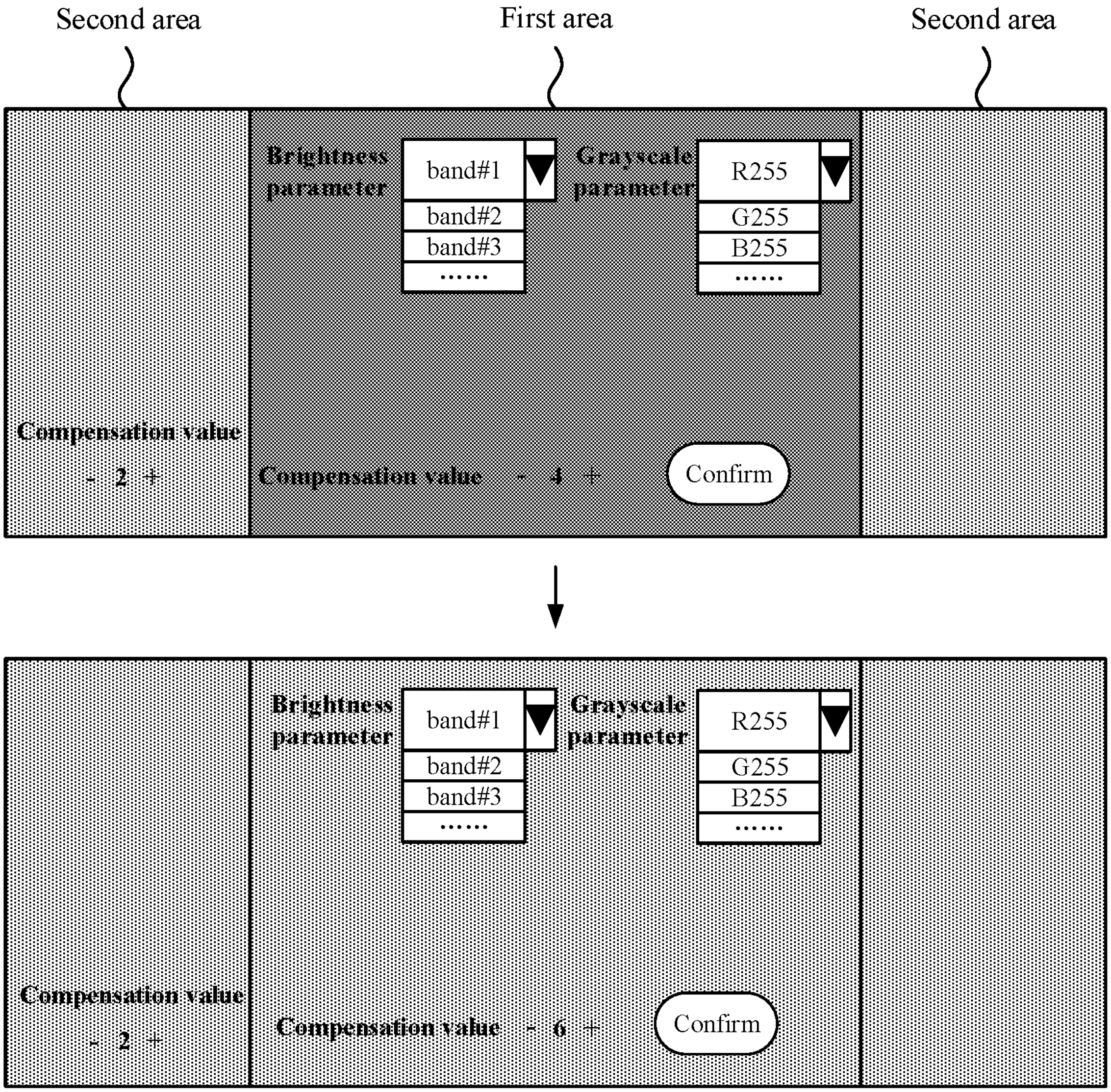
FIG. 5C is another schematic diagram illustrating another user adjusting compensation value according to an embodiment of the present disclosure.

FIG. 5C is another schematic diagram illustrating another user adjusting compensation value according to an embodiment of the present disclosure.

As shown in FIG. 5C, for example, a pure red image with a grayscale parameter of R255 and a brightness parameter of band #1 is displayed by the display panel, and after the preset model calculates the first compensation value to compensate for the brightness of the first area and calculates the second compensation value to compensate for the brightness of the second area, the brightness of the first area is lower than the brightness of the second area, which can be taken as that there is a problem of under-compensation for the first area, or there is a problem of over-compensation for the second area.

In this case, the first compensation value calculated by the preset model and an adjustment button for the first compensation value may be displayed in the first area (for example, a bottom of the first area shown in FIG. 5C), for example, the adjustment button may include a button for reducing the first compensation value on a left side of the first compensation value, and a button for increasing the first compensation value on a right side of the first compensation value, and may further include a confirmation button for confirming an adjusted compensation value.

In addition, the second compensation value calculated by the preset model and an adjustment button for the second compensation value may be displayed in the second area (for example, a bottom of the second area shown in FIG. 5C), for example, the adjustment button may include a button for reducing the second compensation value on a left side of the second compensation value, and a button for increasing the second compensation value on a right side of the second compensation value, and may further include a confirmation button for confirming an adjusted compensation value.

Since the above problem may be understood as an under-compensation problem in the first area, or may be understood as an over-compensation problem in the second area, the first compensation value may be increased, or the second compensation value may be reduced.

Since the life attenuation value of the second area is less than the life attenuation value of the first area, structures in the second area is closer to an initial outgoing situation, so the second compensation value calculated by the preset model may be considered as more accurate than the first compensation value, and therefore, in this case, the first compensation value may be increased first, and when increasing of the first compensation value is not sufficient to set the brightness of the first area same as the brightness of the second area, then it is attempted to both increase the first compensation value and reduce the second compensation value.

It is taken as an example the first compensation value is increased, since there is an under-compensation problem in the first area, the user may increase the first compensation value, for example, as shown in FIG. 5C, the user may increase the first compensation value from 4 to 6, and the display panel may compensate the brightness of the first area according to the adjusted compensation value, and content in the first area is displayed based on a compensated brightness. For example, as shown in FIG. 5C, when the compensation value is 6, the brightness of the first area is same as the brightness of the second area, so that the under-compensation problem is solved, and the user can press the confirmation button to confirm the adjustment value (i.e., +2) on the first compensation value.

The display panel can adjust the parameters in the preset model (in a corresponding memory) in the DDIC based on the adjustment value, so that the first area is subsequently compensated based on the compensation value calculated by the adjusted preset model, and the above under compensation problem can be avoided.

Figure 5D:
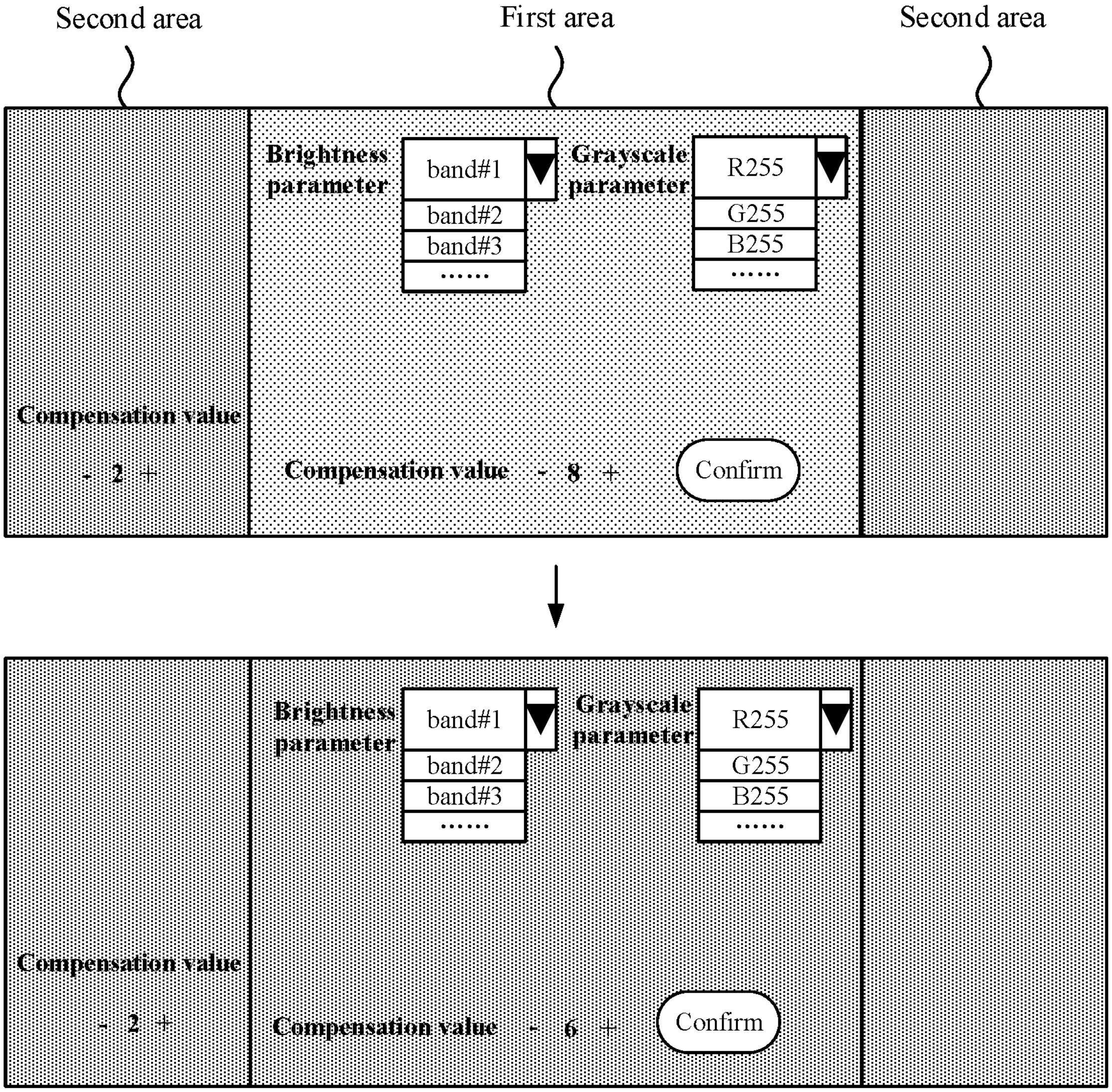
FIG. 5D is another schematic diagram illustrating another user adjusting compensation value according to an embodiment of the present disclosure.

FIG. 5D is another schematic diagram illustrating another user adjusting compensation value according to an embodiment of the present disclosure.

As shown in FIG. 5D, for example, a pure red image with a grayscale parameter of R255 and a brightness parameter of band #1 is displayed by the display panel, and after the preset model calculates the first compensation value to compensate for the brightness of the first area and calculates the second compensation value to compensate for the brightness of the second area, the brightness of the first area is higher than the brightness of the second area, which can be taken as that there is a problem of over-compensation for the first area, or there is a problem of under-compensation for the second area.

In this case, the first compensation value calculated by the preset model and an adjustment button for the first compensation value may be displayed in the first area (for example, a bottom of the first area shown in FIG. 5D), for example, the adjustment button may include a button for reducing the first compensation value on a left side of the first compensation value, and a button for increasing the first compensation value on a right side of the first compensation value, and may further include a confirmation button for confirming an adjusted compensation value.

In addition, the second compensation value calculated by the preset model and an adjustment button for the second compensation value may be displayed in the second area (for example, a bottom of the second area shown in FIG. 5D), for example, the adjustment button may include a button for reducing the first compensation value on a left side of the second compensation value, and a button for increasing the second compensation value on a right side of the second compensation value, and may further include a confirmation button for confirming an adjusted compensation value.

Since the above problem may be understood as an over-compensation problem in the first area, or may be understood as an under-compensation problem in the second area, the first compensation value may be reduced, or the second compensation value may be increased.

Since the life attenuation value of the second area is less than the life attenuation value of the first area, structures in the second area is closer to an initial outgoing situation, so the second compensation value calculated by the preset model may be considered as more accurate than the first compensation value, and therefore, in this case, the first compensation value may be reduced first, and when reducing of the first compensation value is not sufficient to set the brightness of the first area same as the brightness of the second area, then it is attempted to both reduce the first compensation value and increase the second compensation value.

It is taken as an example the first compensation value is reduced, since there is an over-compensation problem in the first area, the user may reduce the first compensation value, for example, as shown in FIG. 5D, the user may reduce the first compensation value from 8 to 6, and the display panel may compensate the brightness of the first area according to the adjusted compensation value, and content in the first area is displayed based on a compensated brightness. For example, as shown in FIG. 5D, when the compensation value is 6, the brightness of the first area is same as the brightness of the second area, so that the over-compensation problem is solved, and the user can press the confirmation button to confirm the adjustment value (i.e., −2) on the first compensation value.

The display panel can adjust the parameters in the preset model (in a corresponding memory) in the DDIC based on the adjustment value, so that the first area is subsequently compensated based on the compensation value calculated by the adjusted preset model, and the above over-compensation problem can be avoided.

It should be noted that an adjustment range of the compensation value may be preset to prevent the user from excessively adjusting the compensation value to cause abnormal display and even damage to the display panel.

For example, the display panel may determine parameters such as a data range of a pixel circuit in the display panel according to a preset model in a Flash corresponding to the DDIC and by reading back a current register configuration of the DDIC, and then further determine the adjustment range under each grayscale parameter and each brightness parameter according to parameters such as the preset model and the data range.

In an embodiment, the display module is further configured to display an adjusted first image according to an adjustment of at least one of the brightness parameter or the grayscale parameter by the user.

As shown in FIG. 5A to FIG. 5D, a brightness parameter and a grayscale parameter corresponding to the first image may be displayed in the window for adjusting the compensation value, and a pull-down button may be provided at a position where the display parameter is displayed, and a pull-down menu may be displayed by clicking the pull-down button, for example, brightness parameters other than a current brightness parameter may be displayed in the pull-down menu of the brightness parameter, and grayscale parameters other than a current grayscale parameter may be displayed in the pull-down menu of the grayscale parameter.

The user may adjust the brightness parameter of the first image by selecting another brightness model, or may adjust the grayscale parameter of the first image by selecting another grayscale model, and the display panel may adjust the displayed first image according to the adjusted brightness parameter and grayscale parameter.

It should be noted that, the user may not adjust the compensation value for the first image before adjustment, but adjust the compensation value in an adjusted first image, and then the display panel may adjust the parameter in the preset model only according to one adjustment value for the compensation value; or, the user may adjust the compensation value for the first image before adjustment, and the user may adjust the compensation value again in the adjusted first image, and the user may adjust the first image by adjusting the brightness parameter and the grayscale parameter multiple times, and adjust the compensation value for each adjusted first image, and then the display panel may adjust the parameter in the preset model according to multiple adjustment values for the compensation value (i.e., multiple compensation values).

The following describes a process of calculating a compensation value by using a preset model with reference to several embodiments.

Figure 6:
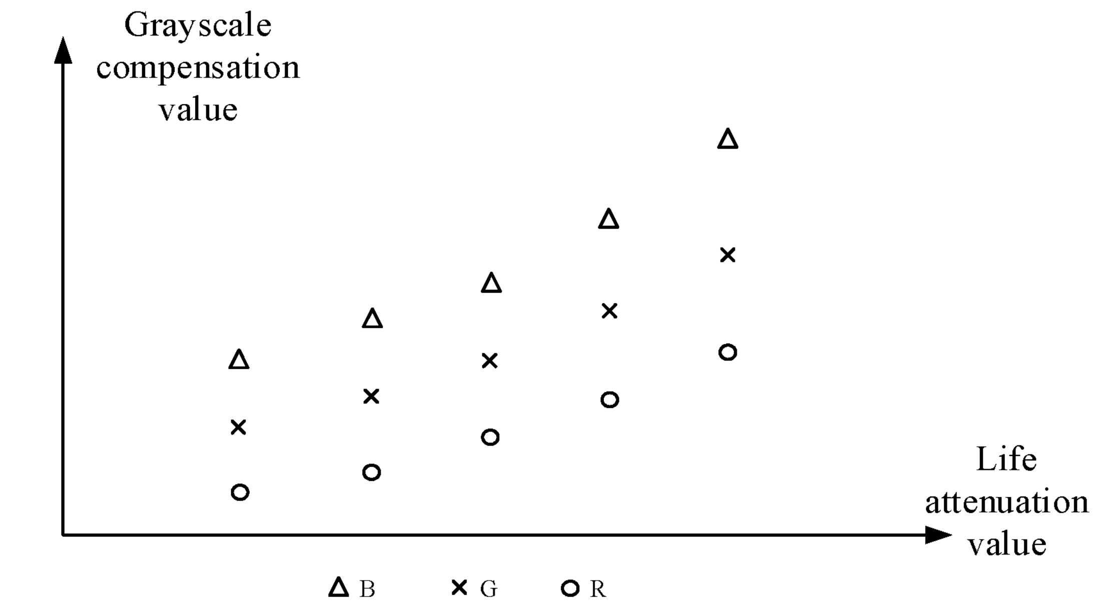
FIG. 6 is a schematic diagram of a relation between a grayscale compensation value and a life attenuation value according to an embodiment of the present disclosure.

FIG. 6 is a schematic diagram of a relation between a grayscale compensation value and a life attenuation value according to an embodiment of the present disclosure.

In an embodiment, the compensation value calculated by using the preset model may be used to compensate for brightness, and the brightness is related to a grayscale, so the compensation value may be a grayscale compensation value offset.

As shown in FIG. 6, for a red sub-pixel R, a green sub-pixel G, and a blue sub-pixel B, as a life attenuation value (which may be understood as a use duration) increases, the brightness decreases, and therefore a required compensation value is greater.

For example, data is used to represent life count (i.e., use duration or life attenuation value), a relation between a grayscale compensation value offset and the data may be:

$$\text{offset} = LUT(\text{data}). \qquad \text{equation 1}$$

The LUT is an abbreviation of a lookup table, which represents a lookup relation table, that is, a correspondence between data and offset is stored in a first relation table, and then an offset corresponding to a data may be determined by searching the first relation table.

However, offset is also related to factors such as brightness and display grayscale, and therefore, offset needs to be corrected in terms of brightness and display grayscale to obtain a corrected offset' as a compensation value.

The brightness may be determined by a Gamma band stored in the DDIC, the DDIC may store 1 to 12 groups of bands, and each band corresponds to different brightness at different grayscale, so that a second relation table between a brightness correction coefficient a and a band may be determined, and a may be determined based on the following equation:

$$a = LUT(\text{band}). \qquad \text{equation 2}$$

That is, a corresponding to a band may be determined by searching the second relation table between a and the band.

In addition, a third relation table between a display grayscale and a grayscale correction coefficient b may also be determined, and b may be determined based on the following equation:

$$b = LUT(\text{gray}). \qquad \text{equation 3}$$

That is, b corresponding to a grayscale may be determined by searching the third relation table between b and the grayscale.

Further, correction value offset' of offset may be obtained according to:

$$\text{offset}' = \text{offset} * a * b. \qquad \text{equation 4}$$

Then, the brightness (which may be regarded as grayscale Gray) of the current display image is compensated based on the compensation value offset', and the compensated grayscale is Gray':

$$\text{Gray}' - \text{Gray} + \text{offset}'. \qquad \text{equation 5}$$

Figure 7:
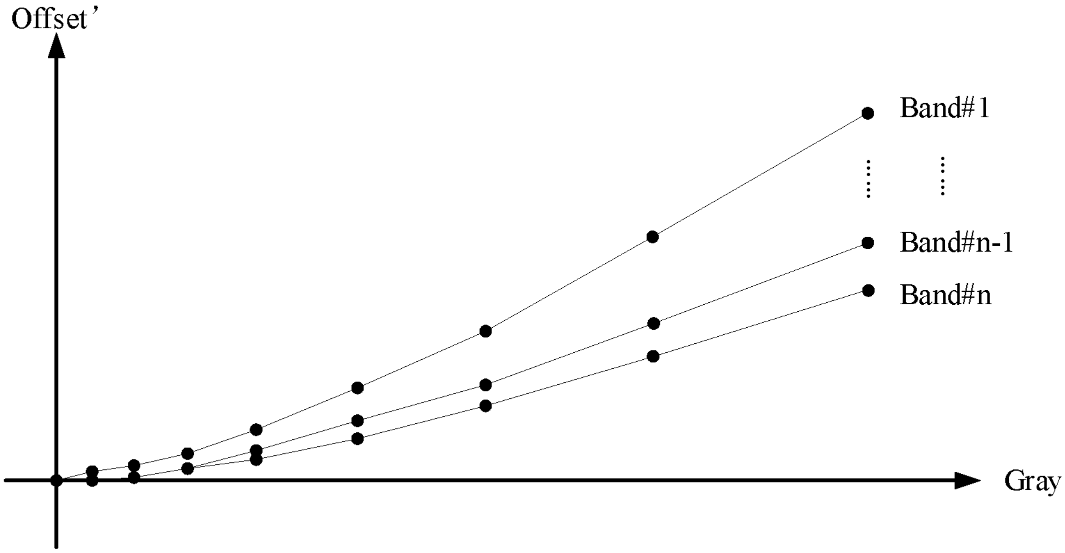
FIG. 7 is a schematic diagram illustrating a relation between grayscale and a compensation value according to an embodiment of the present disclosure.

FIG. 7 is a schematic diagram illustrating a relation between grayscale and a compensation value according to an embodiment of the present disclosure.

As shown in FIG. 7, n Gamma bands are used as an example, for example, Band #1 to Band #n, where n is an integer greater than or equal to 1. An abscissa in a coordinate system is grayscale Gray of a currently displayed image, and an ordinate is a compensation value offset'.

The grayscale Gray of the currently displayed image may be regarded as a grayscale value (that is, a grayscale of a white image) in the grayscale parameter shown in FIG. 5A to FIG. 5D, and Band #1 to Band #n may be regarded as the brightness parameter shown in FIG. 5A to FIG. 5D.

For example, when the grayscale parameter corresponds to 8 binding points, the user may adjust the grayscale parameter to any grayscale corresponding to the 8 binding points, and the display panel may display an image corresponding to the grayscale of the binding point selected by the user. For example, when the brightness parameter corresponds to n bands, the user may adjust the brightness parameter to any band corresponding to the n bands, and the display panel may display an image corresponding to the band selected by the user.

Therefore, after the user selects the grayscale parameter and the brightness parameter, the compensation value determined by the preset model is the compensation value offset' corresponding to an intersection point of the selected band and the selected binding point grayscale in the coordinate system of FIG. 7. The user adjusts offset' in the first image corresponding to the selected grayscale parameter and brightness parameter, that is, adjusts the compensation value offset' corresponding to the intersection point, for example, increases the compensation value, that is, increases the ordinate of the intersection point; or decreases the compensation value, that is, decreases the ordinate of the intersection point.

After the intersection point is adjusted, a correspondence between Gray and offset' on each band changes, which also causes the band to change. Since offset' is changed, equation 4 needs to be changed, and since band is changed, equation 2 needs to be changed. With respect to equation 3 and equation 1, although b and offset are involved in operation of equation 4, offset' in equation 4 can be changed by changing equation 2 only, that is, by adjusting a, and equation 3 and equation 1 can be remained unchanged. Changing only a to adapt change of offset' may cause too much change in equation 2, and in some cases changing only a may not be sufficient to adapt change of offset', thus in a general case, equation 3 and equation 1 also need to be adjusted, to ensure that equation 4 still holds when offset' is changed after b and offset are substituted into equation 4.

Due to adjustment of equation 1, equation 2, and equation 3, the first relation table corresponding to equation 1, the second relation table corresponding to equation 2, and the third relation table corresponding to equation 3 are also adjusted, and the adjusted equation 1, equation 2, and equation 3 (that is, the adjusted first relation table, second relation table, and third relation table) may be used as basis for adjusting the parameters in the preset model.

In an embodiment, the compensation module is further configured to compensate, after each time the first image is adjusted, the brightness of at least one of the first area or the second area in the adjusted first image according to the compensation value calculated by the preset model; the receiving module is further configured to receive a respective adjustment value from the user for a respective compensation value calculated by the preset model each time; and the adjustment module is configured to adjust the parameter in the preset model according to adjustment values received in multiple times.

It can be seen from FIG. 7 that n bands and a plurality of binding points are included, when the compensation value is adjusted in the first image corresponding to one grayscale parameter and one brightness parameter, only one intersection point shown in FIG. 7 is adjusted, and accordingly the parameters in the preset model can be adjusted, the adjusted preset model can calculate an appropriate compensation value only for an image corresponding to the intersection point, and it is hard to calculate appropriate compensation values for images corresponding to other intersection points.

Thus, multiple intersection points in FIG. 7 may be adjusted, such as all intersections. The grayscale parameter and the brightness parameter corresponding to each intersection point can be selected in FIG. 5A to FIG. 5D, so that the user can adjust the grayscale parameter and the brightness parameter as much as possible, for example, traverse all combinations of the grayscale parameter and the brightness parameter, and adjust the compensation value under each combination, so that the offset' corresponding to all intersection points in FIG. 7 are adjusted, and accordingly, it can be ensured that the adjusted preset model can calculate appropriate compensation values for images corresponding to all intersection points.

For a first image obtained after the user adjusts the grayscale parameter and/or the brightness parameter each time, the preset model may calculate the compensation value, and the user may adjust the compensation value calculated by the preset model each time, so that the parameters in the preset model may be adjusted according to the adjustment value input by the user to adjust the compensation value each time.

In an embodiment, the adjusting module is configured to adjust a relation between grayscale and a correction value according to the adjustment value, where the correction value is determined based on a grayscale compensation value, a brightness correction coefficient, and a grayscale correction coefficient; adjust a first relation table between the grayscale compensation value and the life attenuation value, a second relation table between the brightness correction coefficient and the brightness value, and a third relation table between the grayscale correction coefficient and the grayscale value according to the adjusted relation; and adjust the parameter in the preset model according to the adjusted first relation table, second relation table and third relation table.

After the user adjusts the grayscale parameter and the brightness parameter, the compensation value determined by the preset model is, for example, the compensation value offset' corresponding to the intersection point of the band corresponding to the brightness parameter and the grayscale of the binding point in the coordinate system of FIG. 7. The user adjusts offset' in the first image corresponding to the selected grayscale parameter and brightness parameter, that is, adjusts the compensation value offset' corresponding to the intersection point, for example, increases the compensation value, that is, increases the ordinate of the intersection point; or decreases the compensation value, that is, decreases the ordinate of the intersection point.

After the intersection point is adjusted, a correspondence between Gray and offset' on each band changes, which also causes the band to change. Since offset' is changed, equation 4 needs to be changed, and since band is changed, equation 2 needs to be changed. With respect to equation 3 and equation 1, although b and offset are involved in operation of equation 4, offset' in equation 4 can be changed by changing equation 2 only, that is, by adjusting a, and equation 3 and equation 1 can be remained unchanged. Changing only a to adapt change of offset' may cause too much change in equation 2, and in some cases changing only a may not be sufficient to adapt change of offset', thus in a general case, equation 3 and equation 1 also need to be adjusted, to ensure that equation 4 still holds when offset' is changed after b and offset are substituted into equation 4.

Due to adjustment of equation 1, equation 2, and equation 3, the first relation table corresponding to equation 1, the second relation table corresponding to equation 2, and the third relation table corresponding to equation 3 are also adjusted, and the adjusted equation 1, equation 2, and equation 3 (that is, the adjusted first relation table, second relation table, and third relation table) may be used to adjust the parameters in the preset model.

Since equation 1, equation 2, and equation 3 may be presented in a form of relation tables, which is difficult to used for calculation directly, the equation 1, equation 2 and equation 3 may be first input into a conversion function fx( ), to convert the equation 1, equation 2 and equation 3 into a numerical value or a vector, and to adjust the parameters of the preset model.

Figure 8:
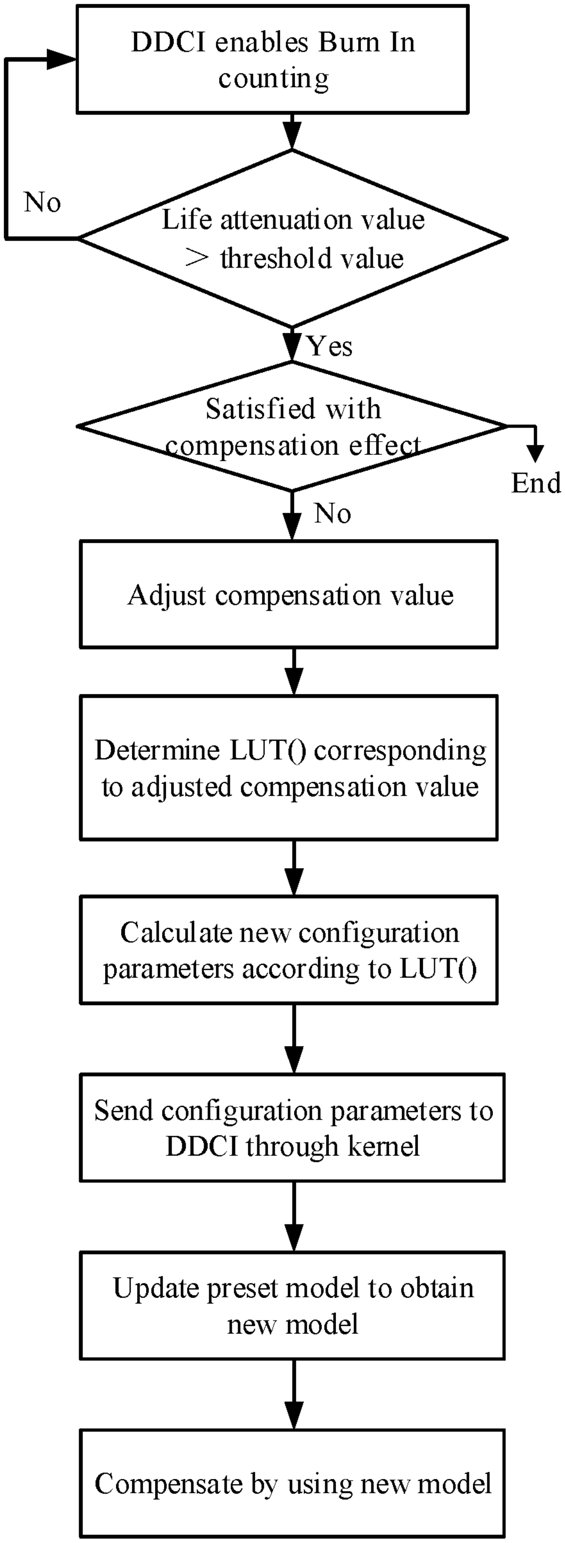
FIG. 8 is a schematic flowchart of a brightness compensation method according to an embodiment of the present disclosure.

FIG. 8 is a schematic flowchart of a brightness compensation method according to an embodiment of the present disclosure.

As shown in FIG. 8, a display apparatus displays a first image through a first area and a second area, and DDIC turns on Burn In counting for recording a life attenuation value. When the life attenuation value is greater than an attenuation threshold, compensation may be enabled to compensate brightness of the first area and/or the second area by calculating a compensation value by using the preset model (after which a compensation control UI shown in FIG. 4A to FIG. 4C may be selected to be displayed), and when the life attenuation value is not greater than the attenuation threshold, compensation does not need to be enabled.

The user may observe whether the compensation effect is satisfied, and when the compensation effect is satisfied (for example, there is no difference in brightness observed between the first display area and the second display area), the compensation value does not need to be adjusted; and when the compensation effect is not satisfied (for example, there is a difference in brightness observed between the first display area and the second display area), the compensation value may be adjusted. For example, the user may enter a window for adjusting the compensation value, for example, the window shown in FIG. 5A to FIG. 5D, and then adjust the compensation value.

Based on the adjustment performed by the user on the compensation value, an adjustment value may be determined, and then the above-described equation 1, equation 2, and equation 3 may be adjusted based on the adjustment value, that is, the LUT ( ) corresponding to each equation is adjusted. Further, parameters in the preset model are adjusted according to the adjusted LUT ( ) for example, new configuration parameters of the preset model in the DDIC are determined first according to the adjusted LUT ( ) and then the new configuration parameters are sent to the DDIC through a kernel driver, and the DDIC updates the preset model accordingly. Subsequently, the compensation value is determined based on the updated preset model, and the first area and the second area may be well compensated.

Corresponding to the above embodiments of the model adjustment apparatus, the present disclosure further provides embodiments of a model adjustment method.

Figure 9:
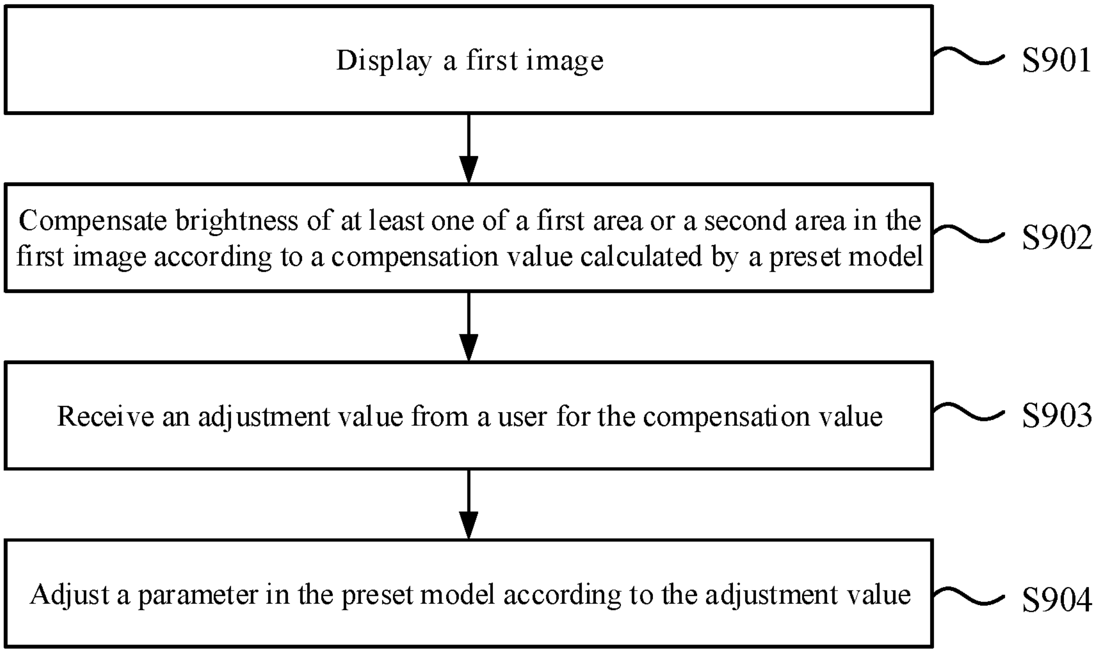
FIG. 9 is a schematic flowchart of a model adjustment method according to an embodiment of the present disclosure.

FIG. 9 is a schematic flowchart of a model adjustment method according to an embodiment of the present disclosure. The method shown in the present embodiment may be performed by a display panel, where the display panel at least includes a first area and a second area, and a life attenuation value of the first area is greater than a life attenuation value of the second area.

As shown in FIG. 9, the method includes:

In step S901, a first image is displayed.

In step S902, at least one of brightness of the first area or the brightness of the second area in the first image are compensated according to a compensation value calculated by a preset model.

In step S903, an adjustment value for the compensation value is received from a user.

In step S904, a parameter in the preset model is adjusted according to the adjustment value.

In an embodiment, the display panel includes an organic light emitting diode display panel.

In an embodiment, the first area is a non-rollable area, and the second area is a rollable area.

In an embodiment, the method further includes: displaying at least one of a brightness parameter or a grayscale parameter corresponding to the first image when displaying the first image.

In an embodiment, the method further includes: displaying an adjusted first image according to an adjustment of at least one of the brightness parameter or the grayscale parameter by the user.

In an embodiment, the method further includes: compensating, after each time the first image is adjusted, the brightness of at least one of the first area or the second area in the adjusted first image according to the compensation value calculated by the preset model; receiving respective adjustment value from the user for a respective compensation value calculated by the preset model each time; and adjusting the parameter in the preset model according to the adjustment value includes: adjusting the parameter in the preset model according to adjustment values received in multiple times.

In an embodiment, the brightness parameter includes a gamma curve; and/or the grayscale parameter includes a grayscale value of a color corresponding to the first image.

In an embodiment, adjusting the parameter in the preset model according to the adjustment value includes: adjusting a relation between grayscale and a correction value according to the adjustment value, where the correction value is determined based on a grayscale compensation value, a brightness correction coefficient, and a grayscale correction coefficient; adjusting a first relation table between the grayscale compensation value and the life attenuation value, a second relation table between the brightness correction coefficient and the brightness value, and a third relation table between the grayscale correction coefficient and the grayscale value according to the adjusted relation; and adjusting the parameter in the preset model according to the adjusted first relation table, second relation table and third relation table.

In an embodiment, compensating brightness of at least one of the first area or the second area in the first image according to a compensation value calculated by a preset model includes: when the first life attenuation value is greater than a first attenuation threshold, compensating the first area with a first compensation value calculated by the preset model; and/or, when the second life attenuation value is greater than a second life attenuation threshold, compensating the second area with a second compensation value calculated by the preset model.

With respect to the method in the above embodiments, specific manner for each step to perform an operation has been described in detail in the embodiments of the related apparatus, which will not be described in detail herein.

Since the apparatus embodiments basically correspond to method embodiments, reference may be made to descriptions of the method embodiments. The apparatus embodiments described above are merely illustrative, where the modules described as separate components may or may not be physically separate, and the components displayed as modules may or may not be physical modules, that is, may be located in one place, or may be distributed to multiple network modules. Some or all of the modules may be selected according to actual needs to achieve the objective of the solution of the present embodiment. Those skilled in the art can understand and implement the present disclosure without making any creative efforts.

An embodiment of the present disclosure further provides a display apparatus, including a display panel, the display panel at least includes a first area and a second area, a life attenuation value of the first area is greater than a life attenuation value of the second area, and the display apparatus further includes: a processor; and a memory for storing a processor-executable instruction; where the processor is configured to implement the above method according to any one of the above embodiments.

An embodiment of the present disclosure further provides a computer-readable storage medium, storing a computer program, when the computer program is executed by a processor, the method according to any one of the above embodiments is implemented.

Figure 10:
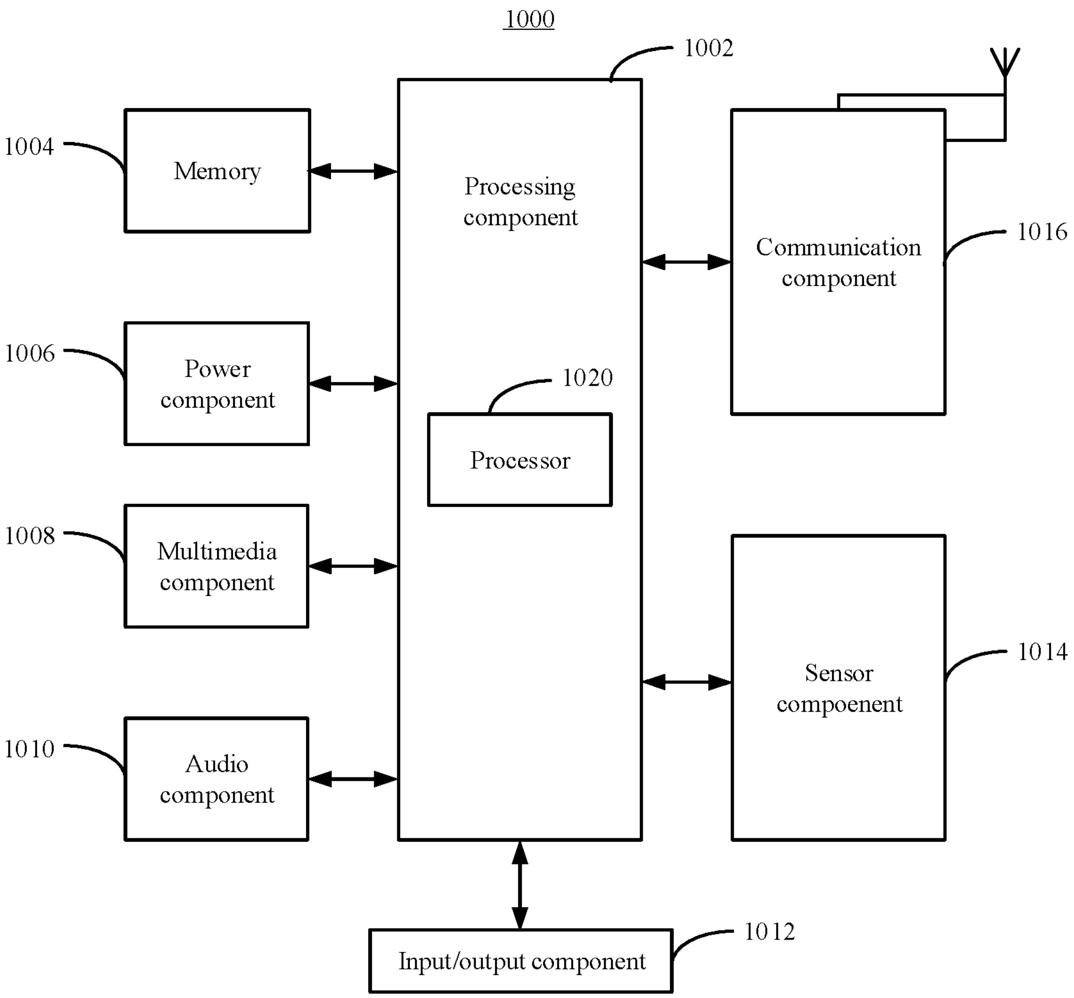
FIG. 10 is a schematic block diagram of a model adjustment apparatus according to an embodiment of the present disclosure.

FIG. 10 is a schematic block diagram of a model adjustment apparatus 1000 according to an embodiment of the present disclosure. For example, the apparatus 1000 may include a mobile phone, a computer, a digital broadcast terminal, a messaging device, a game console, a tablet device, a medical device, fitness equipment, a personal digital assistant, or the like.

Referring to FIG. 10, the apparatus 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls overall operations of the apparatus 1000, such as operations associated with display, telephone calls, data communications, camera operations, and recording operations. The processing component 1002 may include one or more processors 1020 to execute instructions to perform all or part of the steps of the above method. In addition, the processing component 1002 may include one or more modules to facilitate interaction between the processing component 1002 and other components. For example, the processing component 1002 can include a multimedia module to facilitate interaction between the multimedia component 1008 and the processing component 1002.

The memory 1004 is configured to store various types of data to support operations of the apparatus 1000. Examples of such data include instructions for any application or method operating on the apparatus 1000, contact data, phone book data, messages, images, videos, etc. The memory 1004 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disks.

The power component 1006 provides power to various components of the apparatus 1000. The power component 1006 may include a power management system, one or more power sources, and other components associated with generating, managing, and distributing power for the apparatus 1000.

The multimedia component 1008 includes a screen providing an output interface between the apparatus 1000 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, swipes, and gestures on the touch panel. The touch sensor may not only sense a boundary of a touch or slide action, but also detect a duration and pressure associated with the touch or slide operation. In some embodiments, the multimedia component 1008 includes a front camera and/or a rear camera. When the apparatus 1000 is in an operation mode, such as a photographing mode or a video mode, the front camera and/or the rear camera may receive external multimedia data. Each front camera and rear camera can be a fixed optimal lens system or have focal length and optimal zoom capability.

The audio component 1010 is configured to output and/or input audio signals. For example, the audio component 1010 includes a microphone (MIC) configured to receive an external audio signal when the apparatus 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between processing component 1002 and peripheral interface modules, which can be keyboards, click wheels, buttons, etc. These buttons may include, but are not limited to, home button, volume button, start button and lock button.

The sensor component 1014 includes one or more sensors for providing status assessments of various aspects of the apparatus 1000. For example, the sensor component 1014 may detect an open/closed state of the apparatus 1000, relative positioning of components, such as a display and a keypad of the apparatus 1000, a change in position of the apparatus 1000 or a component of the apparatus 1000, a presence or absence of user contact with the apparatus 1000, an orientation or acceleration/deceleration of the apparatus 1000, and a change in temperature of the apparatus 1000. The sensor component 1014 may include a proximity sensor configured to detect the presence of a nearby object without any physical contact. The sensor component 1014 may also include an optical sensor, such as a CMOS or CCD image sensor, for use in imaging applications. In some embodiments, the sensor component 1014 may further include an acceleration sensor, a gyro sensor, a magnetic sensor, a pressure sensor or a temperature sensor.

The communication component 1016 is configured to facilitate wired or wireless communication between the apparatus 1000 and other devices. The apparatus 1000 may access a wireless network based on a communication standard, such as Wi-Fi, 2G or 3G, 4G LTE, 5G NR, or a combination thereof. In an exemplary embodiment, the communication component 1016 receives a broadcast signal or broadcast related information from an external broadcast management system via a broadcast channel. In an exemplary embodiment, the communication component 1016 further includes a near field communication (NFC) module to facilitate short-range communication. For example, NFC modules may be implemented based on radio frequency identification (RFID) technology, infrared data association (IrDA) technology, ultra-wideband (UWB) technology, Bluetooth (BT) technology, and other technologies.

In an exemplary embodiment, the apparatus 1000 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, and is configured to perform the above methods.

In an exemplary embodiment, there is further provided a non-transitory computer-readable storage medium including instructions, such as included in the memory 1004, executable by the processor 1020 of the apparatus 1000, to perform the above method. For example, the non-transitory computer-readable storage medium may be a ROM, a random access memory (RAM), a CD-ROM, a magnetic tape, a floppy disk, an optical data storage device, or the like.

Other embodiments of the disclosure will be readily apparent to those skilled in the art upon consideration of the specification and practice of the disclosure disclosed herein. The present disclosure is intended to cover any variations, uses, or adaptations of the disclosure that follow the general principles of the disclosure and include common knowledge or conventional technical means in the art not disclosed in the disclosure. The specification and examples are to be regarded as exemplary only, with the true scope and spirit of the disclosure being indicated by the following claims.

It should be understood that the present disclosure is not limited to the precise structure described above and shown in the drawings, and various modifications and changes can be made without departing from its scope. The scope of the present disclosure is limited only by the appended claims.

It should be noted that, in this specification, relational terms such as "first" and "second" are merely used to distinguish one entity or operation from another entity or operation, and do not necessarily require or imply that there is any such actual relation or order between these entities or operations. The terms "comprising", "including" or any other variation thereof are intended to cover a non-exclusive inclusion, such that a process, method, article, or device that includes a series of elements includes not only those elements, but also other elements not explicitly listed, or elements inherent to such process, method, article, or device. Without more limitations, an element defined by the statement "including one" does not preclude the presence of another identical element in a process, method, article, or device that includes the element.

The method and apparatus provided by the embodiments of the present disclosure are described in detail above, specific examples are applied herein to describe the principles and implementations of the present disclosure, and the description of the above embodiments is only used to help understand the method and core idea of the present disclosure; meanwhile, for those of ordinary skill in the art, according to the idea of the present disclosure, there will be changes in the specific implementation and application scope, and in summary, the contents of the present disclosure should not be construed as limiting the present disclosure.

The invention claimed is:

1. A model adjustment apparatus, applied in a display panel, wherein the display panel comprises a first area and a second area, a life attenuation value of the first area is greater than a life attenuation value of the second area, and the apparatus comprises:

a processor; and a memory for storing a processor-executable instruction;

wherein the processor is configured to:

display a first image;

compensate brightness of at least one of the first area or the second area in the first image according to a compensation value calculated by a preset model;

receive an adjustment value from a user for the compensation value; and adjust a parameter in the preset model according to the adjustment value;

wherein the processor is further configured to display at least one of a brightness parameter or a grayscale parameter corresponding to the first image when displaying the first image;

wherein the processor is further configured to display an adjusted first image according to an adjustment of at least one of the brightness parameter or the grayscale parameter by the user;

wherein the processor is further configured to:

compensate, after each time the first image is adjusted, a brightness of at least one of the first area or the second area in the adjusted first image according to a compensation value calculated by the preset model;

receive a respective adjustment value from the user for a respective compensation value calculated by the preset model each time; and adjust the parameter in the preset model according to adjustment values received in multiple times.

2. The apparatus according to claim 1, wherein the display panel comprises an organic light emitting diode display panel.

3. The apparatus according to claim 2, wherein the first area is a non-rollable area, and the second area is a rollable area.

4. The apparatus according to claim 1, wherein the brightness parameter comprises a Gamma band;

and/or, the grayscale parameter comprises a grayscale value of a color corresponding to the first image.

5. The apparatus according to claim 4, wherein the processor is configured to adjust a relation between the grayscale parameter and the compensation value according to the adjustment value, wherein the compensation value is determined based on a grayscale compensation value, a brightness correction coefficient, and a grayscale correction coefficient;

adjust a first relation table between the grayscale compensation value and a life attenuation value, a second relation table between the brightness correction coefficient and the brightness parameter, and a third relation table between the grayscale correction coefficient and the grayscale parameter according to the adjusted relation; and adjust the parameter in the preset model according to the adjusted first relation table, second relation table and third relation table.

6. The apparatus according to claim 1, wherein the processor is configured to, when the life attenuation value of the first area is greater than a first attenuation threshold, compensate the first area with a first compensation value calculated by the preset model; and/or, when the life attenuation value of the second area is greater than a second life attenuation threshold, compensate the second area with a second compensation value calculated by the preset model.

7. A model adjustment method, performed by a display panel, wherein the display panel at least comprises a first area and a second area, a life attenuation value of the first area is greater than a life attenuation value of the second area, and the method comprises:

displaying a first image;

compensating brightness of at least one of the first area or the second area in the first image according to a compensation value calculated by a preset model;

receiving an adjustment value from a user for the compensation value; and adjusting a parameter in the preset model according to the adjustment value;

wherein the method further comprises:

displaying at least one of a brightness parameter or a grayscale parameter corresponding to the first image when displaying the first image;

wherein the method further comprises:

displaying an adjusted first image according to an adjustment of at least one of the brightness parameter or the grayscale parameter by the user;

wherein the method further comprises:

compensating, after each time the first image is adjusted, the brightness of at least one of the first area or the second area in the adjusted first image according to the compensation value calculated by the preset model;

receiving respective adjustment value from the user for a respective compensation value calculated by the preset model each time; and wherein adjusting the parameter in the preset model according to the adjustment value comprises:

adjusting the parameter in the preset model according to adjustment values received in multiple times.

8. The method according to claim 7, wherein the display panel comprises an organic light emitting diode display panel.

9. The method according to claim 8, wherein the first area is a non-rollable area, and the second area is a rollable area.

10. The method according to claim 7, wherein the brightness parameter comprises a Gamma band;

and/or, the grayscale parameter comprises a grayscale value of a color corresponding to the first image.

11. The method according to claim 10, wherein adjusting the parameter in the preset model according to the adjustment value comprises:

adjusting a relation between grayscale and a correction value according to the adjustment value, wherein the correction value is determined based on a grayscale compensation value, a brightness correction coefficient, and a grayscale correction coefficient;

adjusting a first relation table between the grayscale compensation value and the life attenuation value, a second relation table between the brightness correction coefficient and the brightness value, and a third relation table between the grayscale correction coefficient and the grayscale value according to the adjusted relation; and adjusting the parameter in the preset model according to the adjusted first relation table, second relation table and third relation table.

12. The method according to claim 7, wherein compensating brightness of at least one of the first area or the second area in the first image according to a compensation value calculated by a preset model comprises:

when the first life attenuation value is greater than a first attenuation threshold, compensating the first area with a first compensation value calculated by the preset model; and/or, when the second life attenuation value is greater than a second life attenuation threshold, compensating the second area with a second compensation value calculated by the preset model.

13. A non-transitory computer-readable storage medium, storing a computer program, wherein when the program is executed by a processor, the method according to claim 7 is implemented.

* * * * *